US011950195B2

(12) United States Patent
He et al.

(10) Patent No.: US 11,950,195 B2
(45) Date of Patent: Apr. 2, 2024

(54) PERFORMING MEASUREMENTS IN TELECOMMUNICATION SYSTEMS INCLUDING ABSOLUTE TIME DIFFERENCE BETWEEN MEASUREMENTS

(71) Applicant: Nokia Technologies Oy, Espoo (FI)

(72) Inventors: Jing He, Beijing (CN); Lars Dalsgaard, Oulu (FI); Riikka Nurminen, Helsinki (FI); Li Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 449 days.

(21) Appl. No.: 17/268,096

(22) PCT Filed: Aug. 17, 2018

(86) PCT No.: PCT/CN2018/101112
§ 371 (c)(1),
(2) Date: Feb. 12, 2021

(87) PCT Pub. No.: WO2020/034206
PCT Pub. Date: Feb. 20, 2020

(65) Prior Publication Data
US 2021/0266854 A1 Aug. 26, 2021

(51) Int. Cl.
H04W 56/00 (2009.01)
H04W 24/10 (2009.01)

(52) U.S. Cl.
CPC ....... H04W 56/0035 (2013.01); H04W 24/10 (2013.01); H04W 56/0015 (2013.01)

(58) Field of Classification Search
CPC ........ H04W 4/33; H04W 4/38; H04W 4/029; H04W 4/80; H04W 84/18; H04W 4/30;
(Continued)

(56) References Cited

U.S. PATENT DOCUMENTS 9,420,535 B2 * 8/2016 Lu et al. .......... H04W 52/0216
2010/0029291 A1 2/2010 Angelow et al. ............. 455/450
(Continued)

FOREIGN PATENT DOCUMENTS

CN 1335036 A 2/2002
CN 102960034 A 3/2013
(Continued)

OTHER PUBLICATIONS

Siomina Iana: Inter-frequency Measurements For FS3 SCells; KR 20190082888 A (Year: 2019).*
(Continued)

Primary Examiner — Meless N Zewdu
(74) Attorney, Agent, or Firm — Harrington & Smith

(57) ABSTRACT

A method, device and computer readable medium for performing measurements in telecommunication systems are disclosed. The method comprises: includes receiving, from a first network device, a first configuration of a first measurement object for a carrier frequency; receiving, from a second network device, a second configuration of a second measurement object for the carrier frequency; determining an absolute time difference between a first measurement timing in the first configuration and a second measurement timing in the second configuration; and in response to determining that the absolute time difference is below a predetermined threshold, performing a single measurement for the carrier frequency based on the first measurement timing in the first configuration or the second measurement timing in the second configuration.

15 Claims, 4 Drawing Sheets

(58) Field of Classification Search
CPC ....... H04W 4/02; H04W 88/16; H04W 88/02;
H04W 88/08; H04W 88/00; H04W 88/18;
H04W 4/90; H04W 4/70; H04W 68/00;
H04W 68/005; H04W 4/14; H04W 4/35;
H04W 4/50; H04W 4/021; H04W
56/0035; H04W 24/10; H04W 56/0015;
H04W 76/16; H04W 56/00; H04W 76/00;
H04W 76/10; H04W 76/15; H04W 76/38;
H04W 24/00; H04W 56/0065; H04W
56/0055; H04W 56/008; H04W 36/249;
H04L 12/2801; H04L 12/2803; H04L
12/2823; H04L 12/2825; H04L 12/283;
H04L 29/06421; H04L 29/06428; H04L
29/06442; H04L 27/00; H04L 27/0006;
H04L 27/0026; H04L 41/5067; H04L
41/0803; H04L 47/28; G05B 2219/23108;
G05B 2219/25186; G05B 2219/25198;
G05B 2219/25215; G05B 2219/31151;
G05B 2219/31152; G05B 2219/131153;
G05B 2219/33192; G06Q 90/205; H04B
2201/71346; H04B 10/114; H04B
10/1143; H04B 10/1149; H04B 7/08;
H04B 7/0811; H04B 10/0775; H04B
10/079; H04B 10/0795; H04B 17/252;
H04B 17/253; H04B 17/255; H04B 17/25
See application file for complete search history.

(56) References Cited

U.S. PATENT DOCUMENTS

| | | | |
|---|---|---|---|
| 2015/0289153 A1 | 10/2015 | Gopal et al. | 24/8 |
| 2016/0037425 A1 | 2/2016 | Van Lieshout et al. | 36/30 |
| 2016/0080953 A1 | 3/2016 | Tokgoz et al. | 24/8 |
| 2016/0234468 A1* | 8/2016 | Hu | H04N 9/31 |
| 2016/0302098 A1 | 10/2016 | Gheorghin et al. | 24/10 |
| 2019/0350023 A1* | 11/2019 | Novlan et al. | |
| 2021/0084511 A1* | 3/2021 | Harada | |

FOREIGN PATENT DOCUMENTS

| | | |
|---|---|---|
| CN | 107431957 A | 12/2017 |
| EP | 1 876 735 A2 | 1/2008 |
| EP | 3 295 706 | 10/2016 |
| WO | WO 2010/062606 A1 | 6/2010 |
| WO | WO 2015/020598 A1 | 2/2015 |
| WO | WO 2015/172798 A1 | 11/2015 |
| WO | WO-2016/161644 A1 | 10/2016 |
| WO | WO 2017/082799 A1 | 5/2017 |
| WO | WO-2018/087737 A1 | 5/2018 |

OTHER PUBLICATIONS

Kim Donggun et al.: Apparatus and Method for Cofngiuring Measurement in Wireless Communication System; KR 20190113472 A (Year: 2019).*

Kazmi Muhammad: A Method for Transmitting Random Access Messages On Non-Anchor Carriers; WO 2018142240 A1 (Year: 2018).*

Siomina Iana: Methods and Radio Nodes for Performing Measurement With Multiple Numerologies; WO 2018083629 A1 (Year: 2018).*

Li et al.: Method and Device for Reporting Measurement Result; WO 2016161644 A1. (Year: 2016).*

"3$^{rd}$ Generation Partnership Project; Technical Specification Group Radio Access Network 1.26 Mcps TDD Home NodeB Radio Frequency (RF) (Release 15), 3GPP TR 25.968 V 15.0.0", Jun. 2018, 17 pages.

"R1-154230, Measurement Gap Configuration and Measurement for MTC UEs", LG Electronics, 3GPP TSG RAN WG1 Meeting #82, Aug. 2015, 3 pages.

"R4-1710614, Discussion on measurement gap configuration in multiple frequency layers for NR", LG Electronics, 3GPP TSG-RAN WG4 Meeting #84bis, Oct. 2017, 3 pages.

* cited by examiner

PERFORMING MEASUREMENTS IN TELECOMMUNICATION SYSTEMS INCLUDING ABSOLUTE TIME DIFFERENCE BETWEEN MEASUREMENTS

CROSS REFERENCE TO RELATED APPLICATION

This patent application is a U.S. National Stage application of International Patent Application Number PCT/CN2018/101112 filed Aug. 17, 2018, which is hereby incorporated by reference in its entirety.

FIELD

Embodiments of the present disclosure generally relate to the field of telecommunications, and in particular, to a method, device and computer readable medium for performing measurements in telecommunication systems.

BACKGROUND

Next Radio (NR) is being developed in the 3rd Generation Partnership Project (3GPP). In the first phase of this development, Non-Standalone (NSA) NR is concerned. In NSA NR, a terminal device may operate in a multiple radio access technology dual connectivity (MR-DC) mode in which the terminal device may be connected to nodes or network devices of multiple radio access technologies (RATs). For example, the terminal device may have a first connection to a network device of UMTS Terrestrial Radio Access Network (E-UTRA) or Long Term Evolution (LTE) and a second connection to a network device of NR (5G). This type of MR-DC may be referred to as E-UTRA NR-Dual Connectivity (EN-DC).

Due to complexity in implementation of the terminal device, a terminal device is only required to measure a limited number of inter-frequency carriers and inter-RAT carriers. To perform measurements for a plurality of carrier frequencies, for each of the carrier frequencies, a network device may configure a measurement object (MO) for the terminal device. In EN-DC, the network device of LTE and the network device of NR may configure separate MOs for the same carrier frequency. It needs to be discussed whether the terminal device should perform two measurements for the two MOs.

SUMMARY

In general, example embodiments of the present disclosure provide a method, device and computer readable medium for performing measurements in telecommunication systems.

In a first aspect, a method implemented at a terminal device is provided. The method comprises: receiving, from a first network device, a first configuration of a first measurement object for a carrier frequency; receiving, from a second network device, a second configuration of a second measurement object for the carrier frequency; determining an absolute time difference between a first measurement timing in the first configuration and a second measurement timing in the second configuration; and in response to determining that the absolute time difference is below a predetermined threshold, performing a single measurement for the carrier frequency based on the first measurement timing in the first configuration or the second measurement timing in the second configuration.

In some example embodiments, performing the single measurement comprises: determining whether the carrier frequency is a serving frequency for one of the first and second network devices or a non-serving frequency for the first or second network device; in response to determining that the carrier frequency is the serving frequency for one of the first and second network devices, determining whether a measurement gap is required; and selecting the first measurement timing in the first configuration or the second measurement timing in the second configuration based on the determination as to whether the measurement gap is required.

In some example embodiments, selecting comprises: in response to determining that the measurement gap is unrequired, selecting the measurement timing from one of the first and second network devices for which the carrier frequency is the serving frequency.

In some example embodiments, selecting comprises: in response to determining that the measurement gap is required, determining whether the measurement gap is configured by the first network device or by the second network device; in response to determining that the measurement gap is configured by the first network device, selecting the first measurement timing in the first configuration; and in response to determining that the measurement gap is configured by the second network device, selecting the second measurement timing in the second configuration.

In some example embodiments, selecting comprises: in response to determining that the carrier frequency is the non-serving frequency for the first or second network device, determining whether the measurement gap is configured by the first network device or by the second network device; in response to determining that the measurement gap is configured by the first network device, selecting the first measurement timing in the first configuration; and in response to determining that the measurement gap is configured by the second network device, selecting the second measurement timing in the second configuration.

In some example embodiments, determining the absolute time difference comprises: determining the absolute time difference based on the following: an absolute time of a starting frame for the first network device, an absolute time of a starting frame for the second network device, a first offset of the first measurement timing in the first configuration, and a second offset of the second measurement timing in the second configuration.

In some example embodiments, at least one of the first and second configurations comprises synchronization signal block (SSB) measurement timing configuration (SMTC).

In some example embodiments, the first network device operates using a first radio access technology, RAT, and the second network device operates using a second RAT, each of the first and second RATs comprises one of the following: Long Term Evolution (LTE), and Next Radio (NR).

In a second aspect, a terminal device is provided. The terminal device comprises at least one processor and at least one memory including computer program code. The at least one memory and the computer program code are configured to, with the at least one processor, cause the terminal device to carry out the method according to the first aspect.

In a third aspect, there is provided a computer-readable medium storing a computer program thereon. The computer program, when executed by a processor, causes the processor to carry out the method according to the first aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
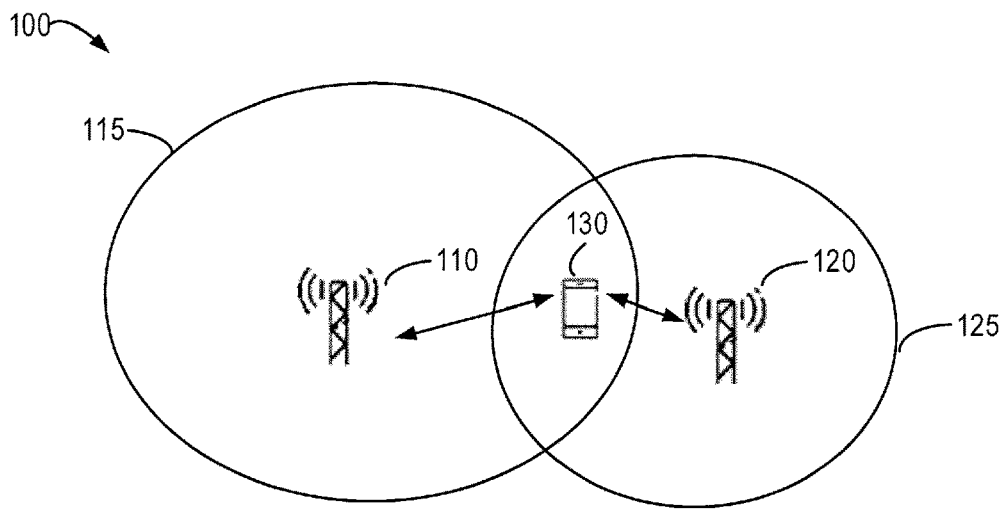
FIG. 1 shows an example communication network in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and 5G NR, and employs any suitable communication technologies, including, for example, MIMO, OFDM, time division multiplexing (TDM), frequency division multiplexing (FDM), code division multiplexing (CDM), Bluetooth, ZigBee, machine type communication (MTC), eMBB, mMTC and uRLLC technologies.

For the purpose of discussion, in some example embodiments, the LTE network, the LTE-A network, the 5G NR network or any combination thereof is taken as an example of the communication network.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), a gigabit NodeB (gNB), a Remote Radio Module (RRU), a radio header (RH), a remote radio head (RRH), a low power node such as a femto, a pico, and the like. For the purpose of discussion, in some example embodiments, the eNB is taken as an example of the network device.

The network device may also include any suitable device in a core network, for example, including multi-standard radio (MSR) radio equipment such as MSR BSs, network controllers such as radio network controllers (RNCs) or base station controllers (BSCs), Multi-cell/multicast Coordination Entities (MCEs), Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs).

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some example embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, in the following, some example embodiments will be described with reference to UEs as examples of the terminal devices, and the terms "terminal device" and "user equipment" (UE) may be used interchangeably in the context of the present disclosure.

As used herein, the term "cell" refers to an area covered by radio signals transmitted by a network device. The terminal device within the cell may be served by the network device and access the communication network via the network device.

As used herein, the term "circuitry" may refer to one or more or all of the following: (a) hardware-only circuit implementations (such as implementations in only analog and/or digital circuitry); and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

FIG. 1 shows an example communication network 100 in which example embodiments of the present disclosure can be implemented. The network 100 includes a first network device 110, a second network device 120 and a terminal device 130. The first network device 110 provides wireless coverage within a cell 115. The second network device 120 provides wireless coverage within a cell 125. It is to be understood that the number of network devices and terminal devices is only for the purpose of illustration without suggesting any limitations. The network 100 may include any suitable number of network devices and terminal devices adapted for implementing example embodiments of the present disclosure.

The terminal device 130 may operate in a DC mode. In the DC mode, the terminal device 130 may be connected to and in communication with two network devices or nodes. For example, as shown in FIG. 1, the terminal device 130 may have a first connection to the network device 110 and a second connection to the network device 120. The first network device 110 may operate using a first RAT and the second network device 120 may operate using a second RAT. The second RAT may be the same as or different from the first RAT. In some example embodiments, the first RAT comprises LTE and the second RAT comprises NR. In some example embodiments, the first RAT comprises NR and the second RAT comprises LTE. In some example embodiments, each of the first and second RATs comprises NR.

In example embodiments where the first RAT comprises LTE and the second RAT comprises NR, the first network device 110 is also referred to as LTE network device 110 and the second network device 120 is also referred to as NR network device 120. This type of DC may be referred to as EN-DC. In EN-DC, the LTE network device 110 may be considered as a master network device or master node (MN) while the NR network device 120 may be considered as a secondary network device or secondary node (SN). The cell 115 may be considered as a primary cell (PCell) while the cell 125 may be considered as a primary secondary cell (P Scell).

The communications in the network 100 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5Q the fifth generation (5G) communication protocols.

The terminal device 130 may monitor (e.g., receive and/or measure one or more parameters) for a plurality of carriers (carrier frequencies). To perform the monitoring or measuring for the plurality of carriers (or carrier frequencies), for each of the carrier frequencies, a network device may transmit a configuration of MO to the terminal device 130.

In example embodiments where the terminal device 130 is configured in dual connectivity (DC) mode (e.g., EN-DC mode), the terminal device 130 may be able to monitor multiple frequency carriers, for example, up to seven carrier frequencies, as defined in 3GPP TS 38.133.

In some example embodiments, a configuration of a MO (for example, the first configuration of the first MO or second configuration of the second MO) may include information that may be used by the terminal device 130 to receive and measure a signal For example, the configuration of the MO may include information identifying one or more carrier frequencies of a signal to be measured, and/or one or more parameters that may be used by the terminal device 130 to perform a measurement of the signal.

In some example embodiments, the signal to be measured by the terminal device 130 may include at least one reference signal. In some example embodiments, the at least one reference signal may include a synchronization signal block (SSB). In such example embodiments, the configuration of the MO may include an SSB measurement timing configuration (SMTC). The SMTC may include configuration information for configuring (or allowing) the terminal device 130 to receive and measure the SSB (or portion thereof). For example, the SMTC may indicate when the SSB on a carrier will be transmitted or is available for measurement. In addition, the SMTC may include a SMTC duration (also referred to as duration), a SMTC periodicity (also referred to as periodicity), and SMTC offset (also referred to as offset). Examples of the SMTC duration may include, but not limited to, 1, 2, 3, 4, and 5 ins. Examples of the SMTC periodicity may include, but not limited to, 5, 10, 20, 40, 80, and 160 ms. Examples of the SMTC offset may include, but not limited to, any of 0 to 4 ms, any of 0 to 9 ms, any of 0 to 19 ins, any of 0 to 39 ins, any of 0 to 79 ins, and any of 0 to 159 ins. For example, in example embodiments where the SMTC periodicity is 5 ms, the SMTC offset may be 0, 1, 2, 3, or 4 ms.

It is to be understood that the SSB and the SMTC are described herein as examples without suggesting any limitation as to the scope of the disclosure, other signals or reference signals to be measured and other types of configuration of a MO may be used.

For example, in some example embodiments, the reference signals to be measured may include channel status information reference signal (CSI-RS). Accordingly, measurement timing configuration for the CSI-RS may be used in some example embodiments.

In some example embodiments, the first network device 110 may cause the terminal device 130 to measure a carrier at a frequency, and the second network device 120 may also cause the terminal device 130 to measure the same carrier at the frequency. In this case, the first network device 110 and the second network device 120 may transmit separate configurations of MOs for the same carrier frequency. For example, the first network device 110 may transmit a first configuration of a first MO for the carrier frequency, and the second network device 120 may transmit a second configuration of a second MO for the same carrier frequency.

A first offset in the first configuration of the first MO is with reference to the timing of the first network device 110, and a second offset in the second configuration of the second MO is with reference to the timing of the second network device 120. The first and/or second offsets can be SMTC offsets, for example. Thus, the first offset and the second offset will be different except in the full synchronization scenario.

In the full synchronization scenario, the first network device 110 and the second network device 120 have the same timing for the starts of slot, subframe and frame and the same system frame number (SFN). In other scenarios (also referred to as asynchronization scenarios) than the full synchronous scenario, due to the different configurations of the MO, the first network device 110 and the second network device 120 may have different timings for one or more of the following: slot, subframe and frame or have different SFN.

Figure 2A:
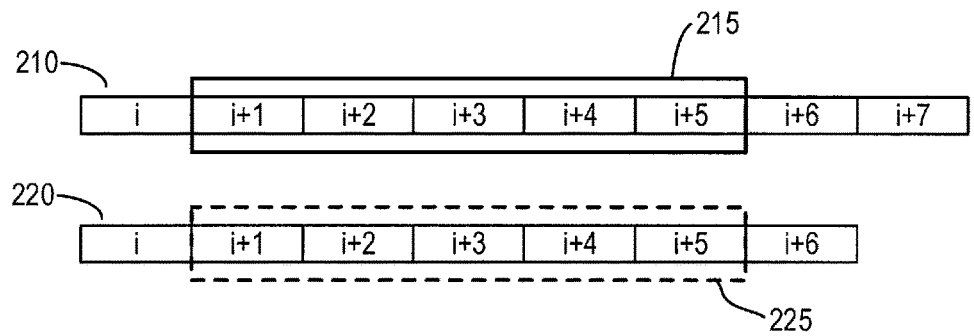
FIG. 2A is a diagram illustrating a full synchronization scenario in accordance with some example embodiments of the present disclosure.

FIG. 2A is a diagram illustrating a full synchronization scenario in accordance with some example embodiments of the present disclosure. As shown, the first network device 110 transmits a first configuration of a first MO 210 for a carrier frequency, and the second network device 120 transmits a second configuration of a second MO 220 for the same carrier frequency. The first configuration 210 includes a first measurement timing configuration window 215, for example, a first SMTC window. The second configuration 220 includes a second measurement timing configuration window 225, for example, a second SMTC window. The first configuration 210 is the same as the second configuration 220. A first offset in the first configuration 210 is i+1 ms (where i is zero or a natural number) and a second offset in the second configuration 220 is also i+1

Figure 2B:
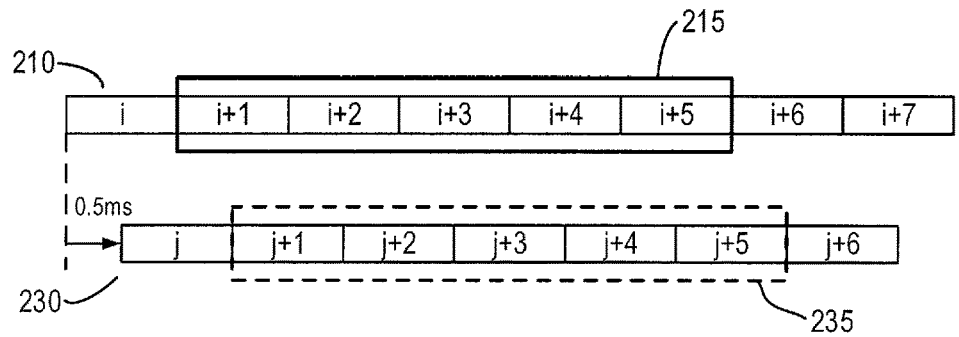
FIG. 2B is a diagram illustrating an asynchronization scenario in accordance with some example embodiments of the present disclosure.

FIG. 2B is a diagram illustrating an asynchronization scenario in accordance with some example embodiments of the present disclosure. As shown, the first network device 110 transmits the first configuration of the first MO 210 for the carrier frequency, and the second network device 120 transmits a second configuration of a second MO 230 for the same carrier frequency. The second configuration 230 includes a second measurement timing configuration window 235, for example, a second SMTC window. Different from FIG. 2A, in the scenario as shown in FIG. 2B, the first configuration 210 is different from the second configuration 230. The first offset in the first configuration 210 is i+1 ms (where i is zero or a natural number) and a second offset in the second configuration 230 is j+1 ms (where j is zero or a natural number). The first offset is different from the second offset.

Currently, it needs to be discussed whether two different offsets in two configurations of MOs would cause a terminal device to perform two different physical measurements for the same carrier frequency and same set of reference signals, such as SSBs.

In this invention, a solution for performing measurement for the same carrier frequency is provided in accordance with the present disclosure. In this solution, a terminal device receives, from a first network device, a first configuration of a first MO for a carrier frequency and receives, from a second network device, a second configuration of a second MO for the same carrier frequency. The first configuration of the first MO includes a first offset. The second configuration of the second MO includes a second offset. If an absolute time difference between the first offset and the second offset is below a predetermined threshold, the terminal device performs a single measurement for the carrier frequency based on the first or second configuration. Because the terminal device performs the single measurement for the carrier frequency, the terminal device considers or counts the first MO and the second MO as one layer for performing signal measurement.

The solution in accordance with the present disclosure allows a terminal device to simplify measurement by only performing one physical measurement per layer when more than one MOs are configured for the layer with different offsets. Thus, efficiency of measurement is improved and measurement resources (e.g., measurement gaps) may be saved. Moreover, the terminal device will be able to measure one more carrier frequency because the terminal device is only required to be able to monitor or measure up to seven carrier frequencies.

Figure 3:
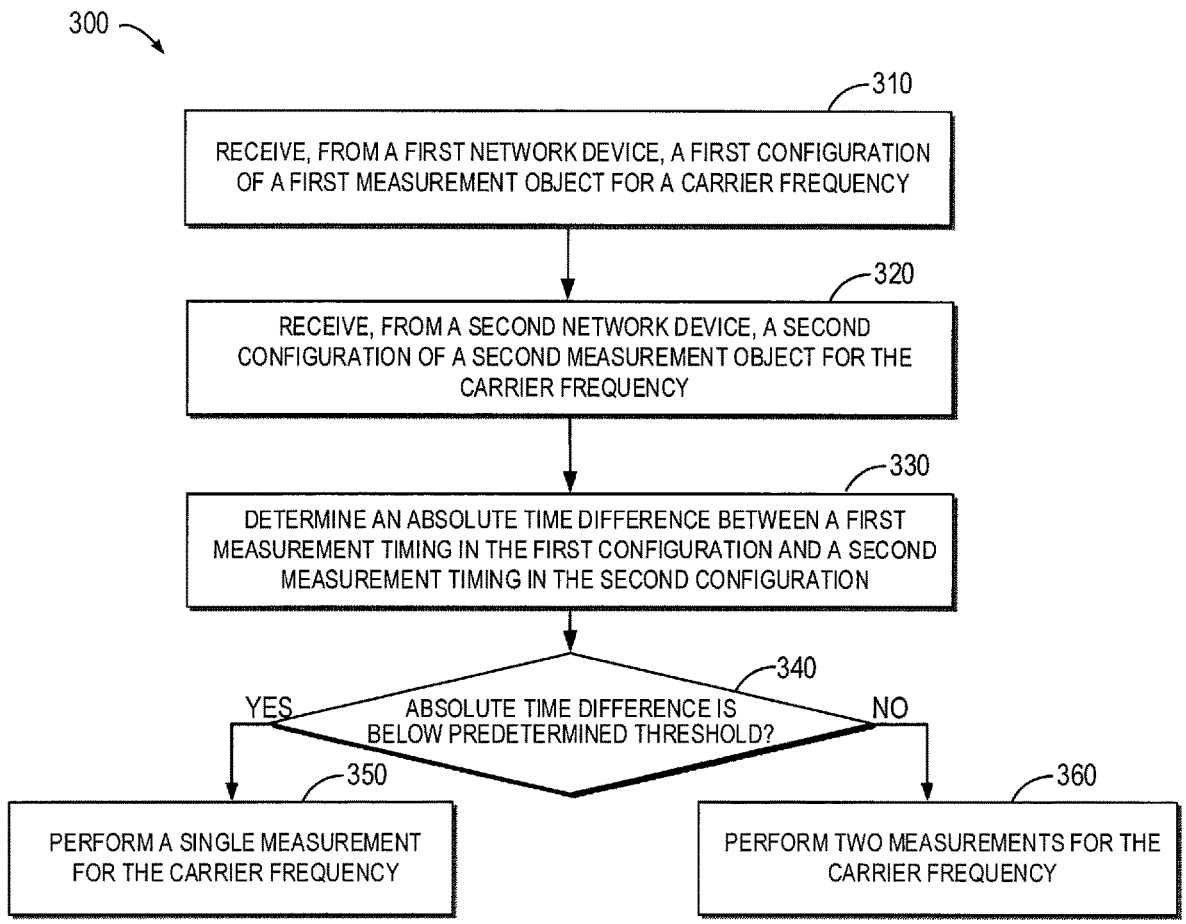
FIG. 3 is a flowchart of a method of performing measurement for the same carrier frequency in accordance with some example embodiments of the present disclosure.

Principle and implementations of the present disclosure will be described in detail below with reference to FIG. 3 which is a flowchart of a method 300 of performing measurement for the same carrier frequency in accordance with some example embodiments of the present disclosure. For the purpose of discussion, the method 300 will be described with reference to FIG. 1. The method 300 may involve the network device 110, the network device 120 and the terminal device 130 in FIG. 1. For example, the method 300 can be implemented at the terminal device 130 as shown in FIG. 1. It is to be understood that the method 300 may include additional blocks not shown and/or may omit some blocks as shown, and the scope of the present disclosure is not limited in this regard.

At block 310, the terminal device 130 receives, from the first network device 110, a first configuration of a first measurement object (MO) for a carrier frequency. The first network device 110 may operate using a first RAT. In some example embodiments, the first RAT comprises LTE or NR.

At block 320, the terminal device 130 receives, from the second network device 120, a second configuration of a second MO for the carrier frequency. The second network device 110 may operate using a second RAT. The second RAT may be the same as or different from the first RAT. In some example embodiments, the second RAT comprises LTE or NR.

In some example embodiments, at least one of the first and second configurations comprises SMTC. In such example embodiments, no matter whether an SMTC is configured by the first network device 110 or by the second network device 120, the SMTC should cover the signal (such as SSBs) on a target carrier frequency (also referred to as a target frequency layer) to be measured. Although the first and second SMTC offsets are configured with reference to the timing of the first network device 110 and the timing of the second network device 120, respectively, it will be enough for the terminal device 130 to perform only one measurement for the target carrier frequency, instead of two measurements, if the SMTC offsets are around the same SSBs.

At block 330, the terminal device 130 determines an absolute time difference between a first measurement timing in the first configuration and a second measurement timing in the second configuration.

In some example embodiments, the terminal device 130 determines the absolute time difference based on the following factors: an absolute time of a starting frame for the first network device 110, an absolute time of a starting frame for the second network device 120, a first offset of the first measurement timing in the first configuration, and a second offset of the second measurement timing in the second configuration. For example, in some example embodiments, the terminal device 130 may determine the absolute time difference by:

$$D = T_{0,MN} - T_{0,SN} + \text{SMTC\_OffSet}_{MN} - \text{SMTC\_offset}_{SN} \quad (1)$$

where D represents the absolute time difference, $T_{0,MN}$ represents an absolute time of a starting frame for the first network device 110, $T_{0,SN}$ represents an absolute time of a starting frame for the second network device 120, SMTC_offset$_{MN}$ represents the first offset, and SMTC_offset$_{SN}$ represents the second offset. It is to be understood that it is just an example that the terminal device 130 determines the absolute time difference based on the above equation (1) without suggesting any limitation as to the scope of the disclosure.

At block 340, the terminal device 130 determines whether the absolute time difference is below a predetermined threshold. In some example embodiments, the predetermined threshold may be 0.5 ms or 0.25 ms. Of course, the predetermined threshold may be any appropriate value depending on a specific application scenario.

If it is determined at block 340 that the absolute time difference is below the predetermined threshold, the method 300 proceeds to block 350 where the terminal device 130 performs a single measurement for the carrier frequency based on the first measurement timing in the first configuration or the second measurement timing in the second configuration.

Consider the example as shown in FIG. 2B, in which the absolute time difference between the first measurement timing in the first configuration of the first MO 210 and the second measurement timing in the second configuration of the second MO 230 is 0.5 ms. For example, if the predetermined threshold is 0.5 ms, the terminal device 130 may determine that the absolute time difference (0.5 ms) is below the predetermined threshold (0.5 ms).

On the other hand, if the terminal device 130 determines at block 340 that the absolute time difference is above the predetermined threshold, at block 360, the terminal device 130 performs two measurements for the carrier frequency based on the first measurement timing in the first configuration and the second measurement timing in the second configuration. In other words, at block 360, the terminal device 130 performs a first measurement for the carrier frequency based on the first measurement timing in the first configuration and performs a second measurement for the carrier frequency based on the second measurement timing in the second configuration. The second measurement is different from the first measurement.

In accordance with the example embodiments of the present disclosure, when the absolute time difference between the two SMTC offsets is less than a predetermined threshold, the terminal device 130 considers the first SMTC from the first network device 110 and the second SMTC from the second network device 120 to be the same. In other words, in this situation, one measurement is determined to be sufficient to cover both the first and second network devices 110 and 120. This is feasible because the terminal device 130 has the knowledge about the timing of the first network device 110 and the timing of the second network device 120. Based on such knowledge, the terminal device 130 can determine whether two SMTCs are in fact overlapping (covering the same SSB burst). If so, the signals at a target carrier frequency can be measured by performing a just single physical measurement.

Figure 4:
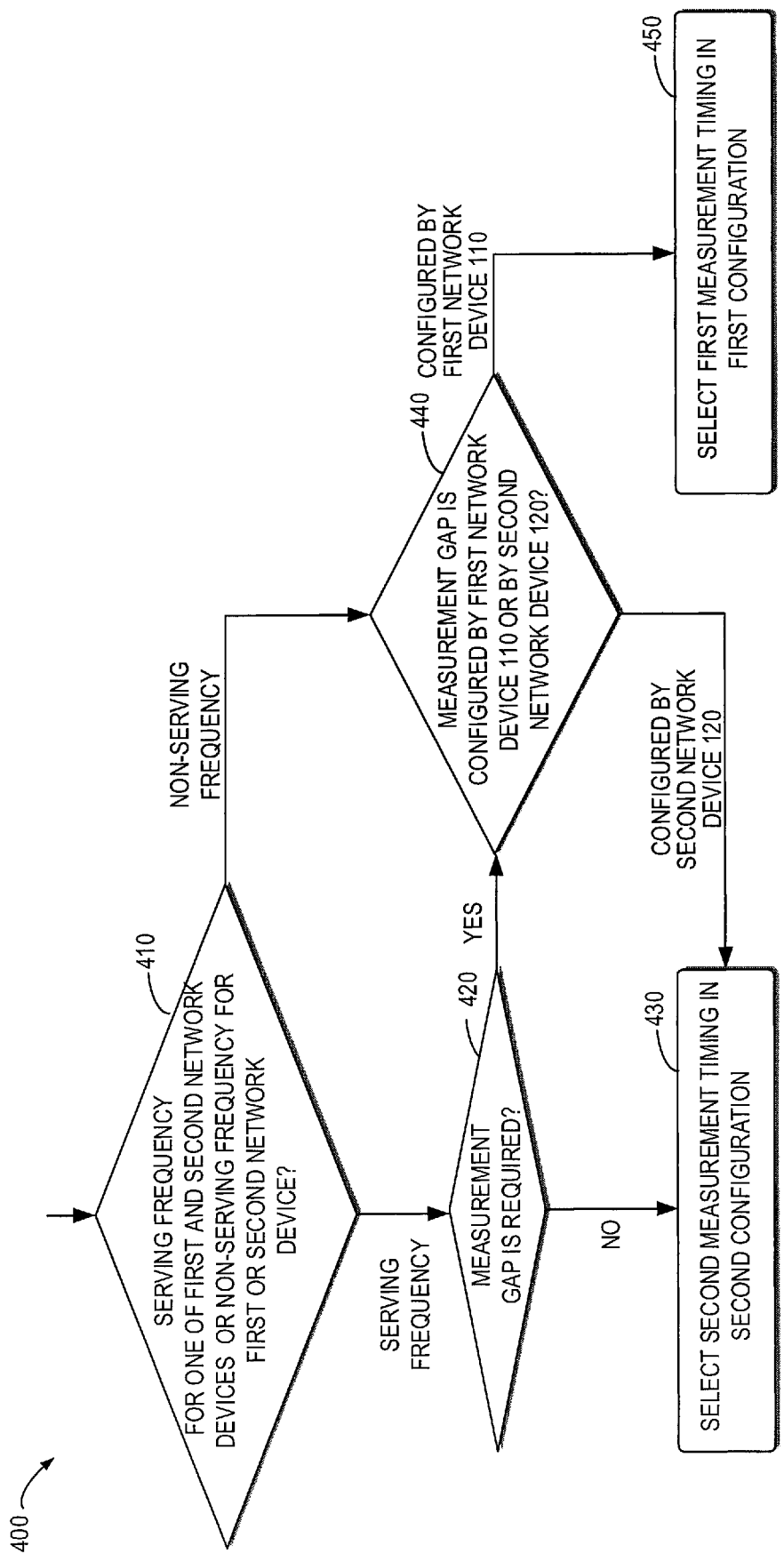
FIG. 4 is a flowchart of a method of performing measurement for the same carrier frequency in accordance with some example embodiments of the present disclosure.

FIG. 4 shows a flowchart of an example method 400 of performing measurement for the same carrier frequency in accordance with some example embodiments of the present disclosure. The method 400 can be implemented at the terminal device 130 as shown in FIG. 1. For the purpose of discussion, the method 400 will be described from the perspective of the terminal device 130 with reference to FIG. 1. For example, the method 400 may be an example implementation of the block 350 as shown in FIG. 3. It is to be understood that the method 400 may include additional blocks not shown and/or may omit some blocks as shown, and the scope of the present disclosure is not limited in this regard.

At block 410, the terminal device 130 determines whether the carrier frequency is a serving frequency for one of the first network device 110 and second network device 120 or a non-serving frequency for the first network device 110 or second network device 120. The carrier frequency may be indicated by the first configuration of the first MO and the second configuration of the second MO, for example.

If the terminal device 130 determines at block 410 that the carrier frequency is a serving frequency for one of the first network device 110 and second network device 120, the terminal device 130 at block 420 determines whether a measurement gap is required. The terminal device 130 may select the first measurement timing in the first configuration or the second measurement timing in the second configuration based on the determination as to whether the measurement gap is required.

If the terminal device 130 determines at block 420 that the measurement gap is not required, the terminal device 130 selects the measurement timing from one of the first network device 110 and second network device 120 for which the carrier frequency is the serving frequency. For example, if the carrier frequency is the serving frequency for the second network device 120, the terminal device 130 selects the second measurement timing in the second configuration at block 430. If the carrier frequency is the serving frequency for the first network device 110, the terminal device 130 selects the first measurement timing in the first configuration at block 450.

On the other hand, if the measurement gap is determined to be required, the terminal device 130 determines at block 440 whether the measurement gap is configured by the first network device 110 or by the second network device 120.

If the terminal device 130 determines at block 440 that the measurement gap is configured by the first network device 110, the method 400 proceeds to block 450, where the terminal device 130 selects the first measurement timing in the first configuration. On the other hand, if the terminal device 130 determines at block 440 that the measurement gap is configured by the second network device 120, the method 400 proceeds to block 430, where the terminal device 130 selects the second measurement timing in the second configuration.

Referring back to block 410, if the terminal device 130 determines that the carrier frequency is the non-serving frequency for the first network device 110 or second network device 120, the method 400 proceeds to block 440, where the terminal device 130 determines whether the measurement gap is configured by the first network device 110 or by the second network device 120.

If it is determined at block 440 that the measurement gap is configured by the first network device 110, the terminal device 130 selects the first measurement timing in the first configuration at block 450. On the other hand, if the terminal device 130 determines at block 440 that the measurement gap is configured by the second network device 120, where the terminal device 130 selects the second measurement timing in the second configuration at block 430.

In the case that the carrier frequency is the frequency of the intra-frequency carrier for the second RAT and the measurement gap is not required, the second configuration of the second MO from the second network device 120 is temporally more accurate to cover the actual signals to be measured (such as SSBs). Thus, selection of the second configuration for the single measurement will lead to more accurate measurement.

In the case that the measurement gap is required, selection of the configuration of the MO from the network device that configures the measurement gap will lead to more accurate measurement, since the measurement may be performed in the measurement gap. The first and second network devices 110 and 120 may configure the measurement gap in any suitable manners, either currently known or to be developed in future, which will not be detailed herein. For measurement based on a measurement gap, the effective measurement time is in the middle of the measurement gap, several microseconds after the start of the gap and the several microseconds before the end of the gap cannot be used for measurement. The terminal device is not expected to measure outside the effective measurement time even part of SMTC duration is there.

In some example embodiments, an apparatus capable of performing the method 300 or 400 (for example, the terminal device 130) may comprise means for performing the respective steps of the method 300 or 400. The means may be implemented in any suitable form. For example, the means may be implemented in a circuitry or software module.

In some example embodiments, the apparatus comprises means for receiving, from a first network device, a first configuration of a first measurement object for a carrier frequency; means for receiving, from a second network device, a second configuration of a second measurement object for the carrier frequency; means for determining an absolute time difference between a first measurement timing in the first configuration and a second measurement timing in the second configuration; and means for in response to determining that the absolute time difference is below a predetermined threshold, performing a single measurement for the carrier frequency based on the first measurement timing in the first configuration or the second measurement timing in the second configuration.

In some example embodiments, means for performing the single measurement comprises: means for determining whether the carrier frequency is a serving frequency for one of the first and second network devices or a non-serving frequency for the first or second network device; means for determining whether a measurement gap is required in response to determining that the carrier frequency is the serving frequency for one of the first and second network devices; and means for selecting the first measurement timing in the first configuration or the second measurement timing in the second configuration based on the determination as to whether the measurement gap is required.

In some example embodiments, means for selecting the measurement timing from one of the first and second network devices for which the carrier frequency is the serving frequency in response to determining that the measurement gap is unrequired.

In some example embodiments, means for selecting comprises: means for determining whether the measurement gap is configured by the first network device or by the second network device in response to determining that the measurement gap is required; means for selecting the first measurement timing in the first configuration in response to determining that the measurement gap is configured by the first network device; and means for selecting the second measurement timing in the second configuration in response to determining that the measurement gap is configured by the second network device.

In some example embodiments, means for selecting comprises: means for determining whether the measurement gap is configured by the first network device or by the second network device in response to determining that the carrier frequency is the non-serving frequency for the first or second network device; means for selecting the first measurement timing in the first configuration in response to determining that the measurement gap is configured by the first network device; and means for selecting the second measurement timing in the second configuration in response to determining that the measurement gap is configured by the second network device.

6. The method of claim 1, In some example embodiments, means for determining the absolute time difference comprises: means for determining the absolute time difference based on the following: an absolute time of a starting frame for the first network device, an absolute time of a starting frame for the second network device, a first offset of the first measurement timing in the first configuration, and a second offset of the second measurement timing in the second configuration.

In some example embodiments, at least one of the first and second configurations comprises synchronization signal block (SSB) measurement timing configuration (SMTC).

In some example embodiments, the first network device operates using a first radio access technology, RAT, and the second network device operates using a second RAT, each of the first and second RATs comprises one of the following: Long Term Evolution (LTE), and Next Radio (NR).

Figure 5:
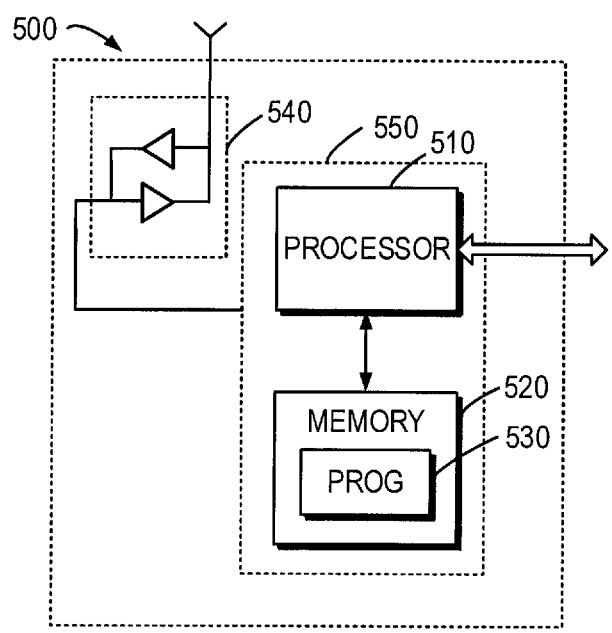
FIG. 5 is a block diagram of a device that is suitable for implementing example embodiments of the present disclosure.

FIG. 5 is a simplified block diagram of a device 500 that is suitable for implementing embodiments of the present disclosure. The device 500 can be considered as a further example implementation of the network device 101 as shown in FIG. 1. Accordingly, the device 500 can be implemented at or as at least a part of the network device 110 or the terminal device 120.

As shown, the device 500 includes a processor 510, a memory 520 coupled to the processor 510, a suitable transmitter (TX) and receiver (RX) 540 coupled to the processor 510, and a communication interface coupled to the TX/RX 540. The memory 520 stores at least a part of a program 530. The TX/RX 540 is for bidirectional communications. The TX/RX 540 has at least one antenna to facilitate communication, though in practice an Access Node mentioned in this application may have several ones. The communication interface may represent any interface that is necessary for communication with other network elements, such as X2 interface for bidirectional communications between eNBs, Si interface for communication between a Mobility Management Entity (MME)/Serving Gateway (S-GW) and the eNB, Un interface for communication between the eNB and a relay node (RN), or Uu interface for communication between the eNB and UE.

The program 530 is assumed to include program instructions that, when executed by the associated processor 510, enable the device 500 to operate in accordance with the embodiments of the present disclosure, as discussed herein with reference to FIGS. 1 to 10. The embodiments herein may be implemented by computer software executable by the processor 510 of the device 500, or by hardware, or by a combination of software and hardware. The processor 510 may be configured to implement various embodiments of the present disclosure. Furthermore, a combination of the processor 510 and memory 520 may form processing means 550 adapted to implement various embodiments of the present disclosure.

The memory 520 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 520 is shown in the device 500, there may be several physically distinct memory modules in the device 500. The processor 510 may be of any type suitable to the local technical network, and may include one or more of general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 300, 400 as described above with reference to FIGS. 3 and 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method, comprising:
   implementing at a terminal device:
   receiving, from a first network device, a first configuration of a first measurement object for a carrier frequency;
   receiving, from a second network device, a second configuration of a second measurement object for the carrier frequency;
   determining an absolute time difference between a first measurement timing in the first configuration and a second measurement timing in the second configuration; and
   in response to determining that the absolute time difference is below a predetermined threshold:
   performing a single measurement for the carrier frequency based on the first measurement timing in the first configuration or the second measurement timing in the second configuration,
   determining whether a measurement gap is required in response to determining the carrier frequency is one of a serving frequency or non-serving frequency for one of the first network device or the second network device; and selecting the first measurement timing in the first configuration or the second measurement timing in the second configuration based on the determination as to whether the measurement gap is required.

2. The method of claim 1, wherein the selecting comprises in response to determining that the measurement gap is unrequired, selecting the measurement timing from one of the first and second network devices for which the carrier frequency is the serving frequency.

3. The method of claim 1, wherein the selecting comprises:
   in response to determining that the measurement gap is required, determining whether the measurement gap is configured by the first network device or by the second network device;
   in response to determining that the measurement gap is configured by the first network device, selecting the first measurement timing in the first configuration; and
   in response to determining that the measurement gap is configured by the second network device, selecting the second measurement timing in the second configuration.

4. The method of claim 1, wherein the selecting comprises:
   in response to determining that the carrier frequency is the non-serving frequency for the first or second network device, determining whether the measurement gap is configured by the first network device or by the second network device;
   in response to determining that the measurement gap is configured by the first network device, selecting the first measurement timing in the first configuration; and
   in response to determining that the measurement gap is configured by the second network device, selecting the second measurement timing in the second configuration.

5. The method of claim 1, wherein determining the absolute time difference comprises:
   determining the absolute time difference based on the following:
   an absolute time of a starting frame for the first network device;
   an absolute time of a starting frame for the second network device;
   a first offset of the first measurement timing in the first configuration; and
   a second offset of the second measurement timing in the second configuration.

6. The method of claim 1, wherein at least one of the first or second configurations comprises synchronization signal block measurement timing configuration.

7. The method of claim 1, wherein the first network device operates using a first radio access technology and the second network device operates using a second radio access technology, each of the first radio access technology and the second radio access technology comprises one of the following:
   Long Term Evolution, or
   New Radio.

8. A terminal device, comprising:
   at least one processor; and
   at least one non-transitory memory;

the at least one memory is storing instructions that when executed by the at least one processor, cause the terminal device to perform:
   receiving, from a first network device, a first configuration of a first measurement object for a carrier frequency;
   receiving, from a second network device, a second configuration of a second measurement object for the carrier frequency;
   determining an absolute time difference between a first measurement timing in the first configuration and a second measurement timing in the second configuration; and
   in response to determining that the absolute time difference is below a predetermined threshold;
   performing a single measurement for the carrier frequency based on the first measurement timing in the first configuration or the second measurement timing in the second configuration,
   determining whether a measurement gap is required in response to determining the carrier frequency is one of a serving frequency or non-serving frequency for one of the first network device or the second network device, and
   selecting the first measurement timing in the first configuration or the second measurement timing in the second configuration based on the determination as to whether the measurement gap is required.

9. The terminal device of claim 8, wherein the selecting comprises:
   in response to determining that the measurement gap is unrequired, selecting the measurement timing from one of the first and second network devices for which the carrier frequency is the serving frequency.

10. The terminal device of claim 8, wherein the selecting comprises:
    in response to determining that the measurement gap is required, determining whether the measurement gap is configured by the first network device or by the second network device;
    in response to determining that the measurement gap is configured by the first network device, selecting the first measurement timing in the first configuration; and
    in response to determining that the measurement gap is configured by the second network device, selecting the second measurement timing in the second configuration.

11. The terminal device of claim 8, wherein selecting comprises:
    in response to determining that the carrier frequency is the non-serving frequency for the first or second network device, determining whether the measurement gap is configured by the first network device or by the second network device;
    in response to determining that the measurement gap is configured by the first network device, selecting the first measurement timing in the first configuration; and
    in response to determining that the measurement gap is configured by the second network device, selecting the second measurement timing in the second configuration.

12. The terminal device of claim 8, wherein determining the absolute time difference comprises:
    determining the absolute time difference based on the following:
    an absolute time of a starting frame for the first network device;

an absolute time of a starting frame for the second network device;

a first offset of the first measurement timing in the first configuration; and a second offset of the second measurement timing in the second configuration.

13. The terminal device of claim 8, wherein at least one of the first or second configurations comprises synchronization signal block measurement timing configuration.

14. The terminal device of claim 8, wherein the first network device operates using a first radio access technology and the second network device operates using a second radio access technology, each of the first radio access technology and second radio access technology comprises one of the following:

Long Term Evolution (LTE), or

Next Radio (NR).

15. A non-transitory computer-readable medium storing a computer program thereon, the computer program, when executed by a processor, causing the processor to carry out:

receiving, from a first network device, a first configuration of a first measurement object for a carrier frequency;

receiving, from a second network device, a second configuration of a second measurement object for the carrier frequency;

determining an absolute time difference between a first measurement timing in the first configuration and a second measurement timing in the second configuration; and in response to determining that the absolute time difference is below a predetermined threshold:

performing a single measurement for the carrier frequency based on the first measurement timing in the first configuration or the second measurement timing in the second configuration, and determining whether a measurement gap is required in response to determining the carrier frequency is one of a serving frequency or non-serving frequency for one of the first network device or the second network device; and selecting the first measurement timing in the first configuration or the second measurement timing in the second configuration based on the determination as to whether the measurement gap is required.

\* \* \* \* \*